United States Patent
Chene et al.

(10) Patent No.: US 10,036,898 B2
(45) Date of Patent: Jul. 31, 2018

(54) METHOD FOR DETERMINING AN OPHTHALMIC LENS COMPRISING AN ASPHERICAL CONTINUOUS LAYER ON ONE OF ITS FACES AND AN ASPHERICAL FRESNEL LAYER ON ONE OF ITS FACES

(71) Applicant: Essilor International, Charenton le Pont (FR)

(72) Inventors: Sylvain Chene, Charenton le Pont (FR); Alain Goulet, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 536 days.

(21) Appl. No.: 14/436,756

(22) PCT Filed: Oct. 18, 2013

(86) PCT No.: PCT/EP2013/071872
§ 371 (c)(1),
(2) Date: Apr. 17, 2015

(87) PCT Pub. No.: WO2014/060590
PCT Pub. Date: Apr. 24, 2014

(65) Prior Publication Data
US 2015/0286068 A1 Oct. 8, 2015

(30) Foreign Application Priority Data
Oct. 18, 2012 (EP) .................................... 12290355

(51) Int. Cl.
*G02C 7/02* (2006.01)
*G02B 3/08* (2006.01)
*G01M 11/02* (2006.01)

(52) U.S. Cl.
CPC ......... *G02C 7/024* (2013.01); *G01M 11/0242* (2013.01); *G02B 3/08* (2013.01); *G02C 7/02* (2013.01); *G02C 2202/20* (2013.01)

(58) Field of Classification Search
CPC .... G02C 7/024; G02C 7/028; G02C 2202/20; G02C 7/02; G02C 7/027; G02C 2202/16; G02B 3/08
USPC ............. 351/159.74, 159.75, 159.76, 159.77
See application file for complete search history.

(56) References Cited

U.S. PATENT DOCUMENTS

| 4,950,057 A * | 8/1990 | Shirayanagi ......... G02B 5/1876 351/159.42 |
| 6,835,204 B1 | 12/2004 | Stork et al. |
| 7,656,585 B1 * | 2/2010 | Powell .................... G02B 5/09 349/11 |
| 2007/0273983 A1 * | 11/2007 | Hebert ................ G02B 5/1895 359/708 |

(Continued)

FOREIGN PATENT DOCUMENTS

| DE | 23 12 872 | 9/1974 |
| GB | 1 154 360 | 6/1969 |
| WO | WO-2013/034949 A1 * | 3/2013 |

*Primary Examiner* — Jordan Schwartz
(74) *Attorney, Agent, or Firm* — Oblon, McClelland, Maier & Neustadt, L.L.P.

(57) ABSTRACT

Method for determining an ophthalmic lens which comprises an aspherical continuous layer and an aspherical Fresnel layer. The aspherical continuous layer is supported by one of the faces of the lens, the same holds for the aspherical Fresnel layer.

15 Claims, 10 Drawing Sheets

(56) References Cited

U.S. PATENT DOCUMENTS

| | | | | |
|---|---|---|---|---|
| 2009/0326693 A1* | 12/2009 | Yanari | ............... | G02C 7/028 |
| | | | | 700/97 |
| 2010/0238400 A1* | 9/2010 | Volk | ............ | G02C 7/061 |
| | | | | 351/159.42 |
| 2011/0273664 A1* | 11/2011 | Guilloux | ............ | G02C 7/02 |
| | | | | 351/159.07 |
| 2014/0211152 A1* | 7/2014 | Colas | ............ | G02C 7/088 |
| | | | | 351/159.75 |
| 2015/0253586 A1* | 9/2015 | Amir | ............ | G02C 7/024 |
| | | | | 351/159.42 |

* cited by examiner

METHOD FOR DETERMINING AN OPHTHALMIC LENS COMPRISING AN ASPHERICAL CONTINUOUS LAYER ON ONE OF ITS FACES AND AN ASPHERICAL FRESNEL LAYER ON ONE OF ITS FACES

RELATED APPLICATIONS

This is a U.S. national stage under 35 USC § 371 of application No. PCT/EP2013/071872, filed on Oct. 18, 2013. This application claims the priority of European application no. 12290355.2 filed Oct. 18, 2012, the entire content of which is hereby incorporated by reference.

FIELD OF THE INVENTION

The subject of the present invention is a method for determining an ophthalmic lens on the basis of an aspherical continuous layer and of an aspherical Fresnel layer. The aspherical continuous layer is supported by one of the faces of the lens, the same holds for the aspherical Fresnel layer. The present invention also relates to a computer program product comprising a series of instructions which when loaded onto a computer gives rise to the execution by said computer of the steps of the methods according to the invention.

The method according to the invention makes it possible to determine a more slender and consequently lighter ophthalmic lens than the ophthalmic lenses of the prior art, for identical prescription. The reduction in thickness of the lens is principally produced by the addition of the aspherical continuous layer on one of the faces; the optical defects induced by this aspherical continuous layer are compensated by the aspherical Fresnel layer, a wide central zone of which is devoid of any rings. This method is particularly useful when the thickness of an ophthalmic lens makes it tricky or unesthetic to mount the latter in a spectacles frame.

BACKGROUND OF THE INVENTION

This section is intended to introduce the reader to the diverse aspects of the art, which may be related to diverse aspects of the present invention which are described and/or claimed hereinbelow. This discussion is considered to be useful in order to provide the reader with background information so as to facilitate a better understanding of the various aspects of the present invention. Consequently, it must be understood that these statements must be read in this light, and not as a declaration of the prior art.

Any ophthalmic lens, intended to be carried in a frame, is associated with a prescription. Ophthalmically speaking the prescription can comprise a power prescription, positive or negative, as well as an astigmatism prescription. These prescriptions correspond to corrections to be afforded the wearer of the lenses in order to correct the defects of his vision. A lens is mounted in the frame as a function of the prescription and of the position of the wearer's eyes with respect to the frame.

In the simplest cases, the prescription reduces to a power prescription, positive or negative, and optionally an astigmatism prescription, the lens is then termed "unifocal". When the prescription does not comprise any astigmatism, the lens exhibits symmetry of revolution. It is simply mounted in the frame so that the wearer's principal direction of gaze coincides with the axis of symmetry of the lens. For presbyopic wearers, the value of the power correction is different in far vision and in near vision, on account of the difficulties of accommodation in near vision. The prescription is then composed of a far vision power value and of an addition (or power progression) representative of the power increment between far vision and near vision; this amounts to a power prescription for far vision and to a power prescription for near vision. Lenses suitable for presbyopic wearers are progressive multifocal lenses; these lenses are described for example in EP 2 249 195 B1 or EP 2 251 733 B1. Progressive multifocal ophthalmic lenses comprise a far vision zone, a near vision zone, an intermediate vision zone, a principal meridian of progression passing through these three zones. Families of progressive multifocal lenses are defined, each lens of a family being characterized by an addition, which corresponds to the variation of power between the far vision zone and the near vision zone. More precisely, the addition, denoted A, corresponds to the power variation on the meridian between a point VL of the far vision zone and a point VP of the near vision zone, which are respectively called the far vision reference point and the near vision reference point, and which represent the points of intersection of the gaze and of the surface of the lens for vision at infinity and for reading vision.

In a conventional manner, a lens can be defined by its base (or mean sphere of its front face in far vision) and by a power addition in the case of a multifocal lens. On the basis of semi-finished lenses, only one face of which complies with a given addition/base pair, it is possible to prepare lenses suited to each wearer, by simple machining of a prescription face which is generally spherical or toric.

For any ophthalmic lens, the laws of optics for the paths of rays give rise to the appearance of optical defects when the light rays deviate from the central axis of the lens. These known defects which among others comprise a power defect and an astigmatism defect can in a generic manner be called "obliquity defects of the rays". The person skilled in the art knows how to compensate these defects partially. For example, EP-A-0 990 939 proposes a method for determining by optimization an ophthalmic lens for a wearer having an astigmatism prescription. Obliquity defects have also been identified for progressive multifocal lenses. For example, WO-A-98 12590 describes a procedure for determining by optimization a suite of multifocal ophthalmic lenses.

An ophthalmic lens comprises an optically useful central zone, which can extend over the entire lens. The expression "optically useful" zone is intended to mean a zone in which the power defect and astigmatism defect have been minimized so as to allow satisfactory visual comfort for the wearer. In a progressive lens, the optically useful central zone will cover at least the far vision zone, the near vision zone and the progression zone.

Generally, the optically useful zone covers the entire lens which exhibits a diameter of restricted value. However, in certain cases, a "peripheral" zone is envisaged around the perimeter of the ophthalmic lens. This zone is termed "peripheral" since it does not meet the prescribed conditions of optical correction and exhibits significant obliquity defects. The optical defects of the "peripheral" zone are not detrimental to the wearer's visual comfort since this zone is situated outside the wearer's customary field of vision. A connection must then be provided between the optically useful central zone and the peripheral zone.

There are principally two situations in which an ophthalmic lens exhibits a peripheral zone such as this. On the one hand, when the lens exhibits a significant diameter which may be imposed by the shape of the frame, for example an elongate frame with a large wrap, and on the other hand when the power prescription is high, the lens then exhibiting a significant edge thickness or center thickness that it is sought to reduce.

In the case of an ophthalmic lens intended to be fitted into a wraparound frame, for example to 15 degrees, the lens exhibits a spherical or toric front face of large camber (or large base), between 6 diopters (denoted "D" in what follows) and 10 diopters, and a rear face calculated specifically to attain the optimal correction of the wearer's ametropia at the optical center and in the field of vision. For example, for a front face having a given curvature, the rear face is machined to ensure the correction as a function of each wearer's ametropia.

The large camber of the front face gives rise to a large thickness of the lens on the edges in the case of a lens with negative power or a large thickness of the lens at the center in the case of a lens with positive power. These large thicknesses increase the weight of the lenses, which is detrimental to the comfort of the wearer and make them unesthetic. Moreover, for certain frames, the edge thickness must be controlled to allow the lens to be mounted in the frame.

For negative lenses, the thicknesses at the edges can be reduced by filing down by virtue of a manual facet. A thinning of the lens can also be controlled by optical optimization. An aspherization or an atorization can be calculated, at least for one of the faces of the lens, by taking into account the wearing conditions of the lens with respect to a lens of small camber of like prescription, so as to decrease the center and edge thicknesses of the lens of large camber. Optical aspherization or atorization solutions such as these are for example described in the documents U.S. Pat. No. 6,698,884, U.S. Pat. No. 6,454,408, U.S. Pat. No. 6,334,681, U.S. Pat. No. 6,364,481 or else WO-A-97 35224.

Moreover, in the case of a lens with strong prescription, the cribbed lens exhibits a significant thickness at the edge, nasal side for a positive lens (case of a hypermetropic wearer) and temporal side for a negative lens (case of a myopic wearer). These edge thickenings complicate the mounting of the lens in the frame and make the ophthalmic lenses heavier to wear.

EP 2 028 529 A1 describes a method for determining the two faces of an ophthalmic lens by taking into account the prescription, information on the position of the lens with respect to the wearer's eyes and information on the geometry of the frame in which the lenses must be mounted. This first solution of the prior art proposes to adapt the curvature of the front face of an ophthalmic lens to improve the esthetics of the mounting of the lens in the frame.

WO 2008/037892 describes a method for determining an ophthalmic lens comprising an optically useful zone, a peripheral zone, such as described above, making it possible to reduce the edge and/or center thickness of the lens as well as a connection zone possessing a curvature profile which is optimized for the comfort of the wearer. This solution of the prior art proposes to reduce the edge and/or center thickness of the ophthalmic lenses by aspherizing or by locally atorizing one face of the lens knowing the other face so as to facilitate mounting in spectacles frames. The proposed solution exhibits a connection between the optically useful central zone and the thinned peripheral zone. Adherence to the prescription reduces to the optically useful zone. This solution is not accepted by all wearers because of the "peripheral" zone in which the vision is not corrected.

The solutions proposed in the prior art do not make it possible to simultaneously solve the problems posed by the esthetics of the mounting of an ophthalmic lens in the frame and those posed by mounting in frames.

Moreover, the need always exists for a lens which better satisfies wearers with optimal optical performance while exhibiting a reduced thickness so as to improve the esthetic aspect of the lens and the wearer's comfort.

SUMMARY OF THE INVENTION

One object of the present invention is to determine an ophthalmic lens in accordance with a prescription over the whole of its surface, in particular the lens is devoid of any "peripheral" zone and any connection zone in which the power prescription is not adhered to or is only partially adhered to. Accordingly, the invention proposes to add an aspherical continuous layer on one of the faces of a lens configured to satisfy a prescription and to also add an aspherical Fresnel layer on one of these faces. The effect of the aspherical continuous layer is for example to reduce the thickness of the lens and the effect of the aspherical Fresnel layer is for example to correct the optical effects induced by the aspherical continuous layer on the light passing through the lens. The shape and the disposition of the Fresnel layer are such that the undesirable effects inherent to Fresnel structures are not visible at the center of the lens by the wearer.

For this purpose, one aspect of the invention is directed to a method for determining an ophthalmic lens comprising a front face and a rear face, the front face and the rear face each comprising a geometric center FFGC, RFGC, a prescription being determined for a wearing of said lens by a wearer under usual wearing conditions, the method being implemented by computer and comprising a step for:

S1 defining an optical target LT for said lens which complies with said prescription and a minimum thickness $W_m$ of said lens;

S10 determining a first surface SF1 carried by a front face of a first virtual ophthalmic lens VL1 and a second surface SF2 carried by said rear face of said first virtual lens VL1 so that said first virtual lens VL1 complies with said prescription and possesses at each of its points a thickness greater than or equal to the minimum thickness $W_m$;

S20 determining a maximum thickness $W_M$ of said first virtual lens VL1;

S21 determining a diameter $D_F$ and a height h;

S30 modeling a first aspherical continuous layer ACL1 joining points forming a continuous surface, referenced with respect to a first datum defined by a first origin O1 and a first system of axes x1, y1, z1, where the first continuous layer ACL1 is configured so that the first origin O1 is one of the points of the first continuous layer ACL1 which comprises at this point O1 a zero curvature according to one of said axes z1 of said first system of axes and so that the points making up the first continuous layer ACL1 which are separated from said axis z1 by a radial distance of strictly less than $D_F/2$ have a component according to said axis z1 that is strictly less than said height h;

S31 modeling a second aspherical continuous layer ACL2 joining points forming a continuous surface, referenced with respect to a second datum defined by a second origin O2 and a second system of axes x2, y2, z2, where the second continuous layer ACL2 is configured so that the second origin O2 is one of the points of the second continuous layer ACL2 which comprises at this point O2 a zero curvature according to one of the axes z2 of the second system of axes x2, y2, z2;

S32 modeling an aspherical Fresnel layer AFL on the basis of a cutting of said first continuous layer ACL1, the Fresnel layer AFL being referenced with respect to the first datum, where said Fresnel layer AFL comprises a plurality of rings with aspherical profiles and a plurality of discontinuities located in a plane orthogonal to said axis z1 passing through the first origin O1 and delimiting said rings, said discontinuities being inscribed in one another, the discontinuity in which no discontinuity is inscribed being called the "first discontinuity", said cutting is configured so that a circle of diameter $D_F$ centered on said first origin O1 is inscribed in said first discontinuity;

S33 modeling a second virtual ophthalmic lens VL2 on the basis of the first virtual lens VL1, where said Fresnel layer AFL is added to one of the first or second surfaces SF1, SF2 of said first virtual lens VL1 so that the first origin O1 is placed on the geometric center FFGC, RFGC of the face which carries said Fresnel layer AFL and where the second continuous layer ACL2 is added to one of the first or second surfaces SF1, SF2 of said first virtual lens VL1 so that the second origin O2 is placed on a predefined point of the face which carries said second continuous layer ACL2 and where said second virtual lens VL2 possesses at at least one point with a thickness equal to $W_m$;

S40 determining said Fresnel layer AFL and said second layer ACL2 by an optical optimization employing said optical target LT so that said second virtual lens VL2 complies with said prescription and so that it possesses a maximum thickness of strictly less than $W_M$;

S50 determining said ophthalmic lens as the second virtual lens VL2.

According to the embodiments, the method for determining an ophthalmic lens according to the invention can comprise one or more of the following characteristics:

the diameter $D_F$ is greater than or equal to 30 mm and the height h is less than or equal to 500 μm;
said diameter $D_L$ of the ophthalmic lens lies between 70 mm and 80 mm;
said ophthalmic lens is of progressive multifocal type or of unifocal type;
said first surface SF1 is a "free form" surface;
said second surface SF2 is a "free form" surface.

One aspect of the invention is directed to a method for manufacturing an ophthalmic lens determined by a method such as presented hereinabove, where said Fresnel layer AFL is inscribed on a flexible patch of constant thickness which is applied, for example by gluing, to a surface carried by one of the faces of the lens. This manufacturing method is advantageous since it is easier to make a Fresnel structure on a flexible support (inscription on the flexible patch which is overlaid onto a surface carried by an ophthalmic lens face) than on a rigid support (direct inscription on the surface carried by the ophthalmic lens face).

One aspect of the invention is directed to a computer program product comprising a series of instructions which when loaded into a computer gives rise to the execution by said computer of the steps of a method according to the invention.

Another aspect of the invention is directed to a medium readable by computer carrying a series of instructions of the computer program product.

The advantages of ophthalmic lenses according to embodiments of the invention carrying standard prescriptions (between −5 D and +5 D) are, for equal prescriptions: a significant reduction in the thicknesses and therefore in the mass of the lens, easy mounting because the front face can be configured to carry on its periphery a curvature substantially equal to that of the frame, even for a spectacle frame of cambered type.

Furthermore, the lenses according to embodiments of the invention are devoid of any peripheral zone: the useful zone optically covers the whole of the lens. Stated otherwise, the wearing of a lens according to embodiments of the invention does not produce any image jump for the wearer of the lens when the latter changes direction of gaze.

The variation in power and in residual astigmatism perceived by the wearer is reduced with respect to the lenses of the prior art, particularly those which comprise a "peripheral" zone and a connection zone.

When the Fresnel layer AFL and the second continuous layer ACL2 are placed on the same face, the astigmatism variation perceived by the wearer can be still more reduced.

The Fresnel layers AFL implemented in the method according to embodiments of the invention are configured so that known drawbacks induced by Fresnel layers, such as the nuisance images produced by the rings constituting the Fresnel layer, do not inconvenience the wearer. In particular, the diameter of a circle inscribed in the "smallest" of the rings of the aspherical Fresnel layer AFL is configured in such a way that the wearer's vision is not impaired for directions of gaze inclined up to 30 degrees with respect to the principal axis of gaze.

For unifocal lenses, other advantages of the method according to embodiments of the invention reside in the increase in the power range (beyond +/−5 D) that they allow as well as in the possibility that they offer of making lenses of significant diameters while preserving a large base, and which consequently are suited to the solar solutions mounted in wraparound frames.

BRIEF DESCRIPTION OF THE DRAWINGS

The invention will be better understood and illustrated by means of the embodiments and its following, wholly non-limiting, examples of execution, with reference to the appended figures in which.

DETAILED DESCRIPTION OF THE DRAWINGS

It is understood that the descriptions of the present invention have been simplified to illustrate the elements which are relevant for a clear understanding of the present invention, while eliminating, for clarity purposes, numerous other elements found in the ophthalmic lenses face determination methods. However, because they are well known in the prior art, a detailed discussion of these elements is not envisaged here. The present disclosure is directed toward all these variations and the modifications known to the person skilled in the art.

Five examples of particularly advantageous ophthalmic lenses produced by means of the method according to the invention are briefly presented. The parameters used in the implementation of the method to obtain these five examples will be detailed below. For these various examples of lenses, the value of the refractive index considered is equal to 1.665 and the height of the first tooth (or of the first ring) of the Fresnel layer AFL (which is described below) is equal to 250 μm.

A unifocal lens having a positive prescription of 5 D and a front face of curvature corresponding to a base 8 is firstly considered. The diameter of the lens is equal to 80 mm.

A first lens of the prior art carrying this prescription has a thickness at its center equal to 9 mm and a thickness at its edges equal to 2.54 mm. It is beneficial to employ a lens having the same prescription, thinned down at its center.

For equal prescription, a first lens determined by a method according to the invention, starting from this first lens of the prior art, possesses a thickness at the center of less than 3.82 mm for an aspherical continuous layer ACL2 placed on the rear face and an aspherical Fresnel layer AFL placed on the front face.

For equal prescription, a second lens determined by a method according to the invention, starting from the first lens of the prior art, possesses a thickness at the center of less than 4.47 mm for the aspherical continuous layer ACL2 and the aspherical Fresnel face AFL placed on the rear face of the lens.

These first and second lenses have exactly the same thickness at the edges as the first lens of the prior art, that is to say an edge thickness equal to 2.54 mm. The reduction in thickness at the center of the first and second lens is respectively 57% and 50% with respect to the first lens according to the prior art; this being the sought-after objective. This result is attained without any ring appearing in a central circular zone, here circular and of diameter equal to 39 mm and 36 mm respectively for the first and the second lens.

Figure 6:
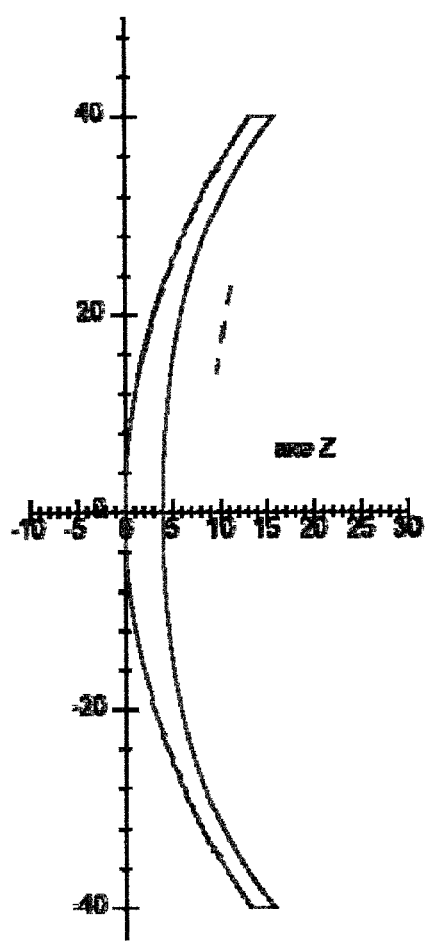
FIGS. 6, 7, 8, 9, 10 represent a schematic sectional view of a superposition of an exemplary advantageous ophthalmic lens (solid line) produced by a method according to one embodiment of the invention and of the first virtual lens (dotted line) that served for the implementation of this method.

FIG. 6 represents in a sectional view: dotted line, the first lens according to the prior art and, solid line, the first exemplary lens produced by the method according to the invention.

Figure 7:
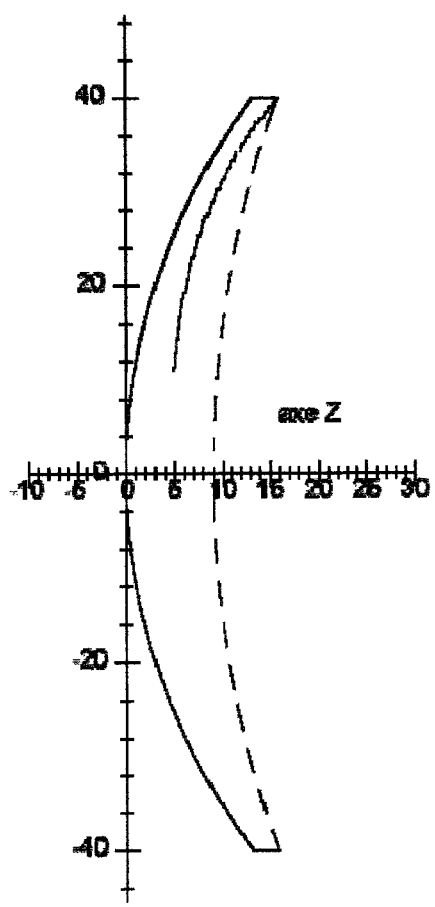

FIG. 7 represents in a sectional view: dotted line, the first lens according to the prior art and, solid line, the second exemplary lens produced by the method according to the invention.

A unifocal lens having a negative prescription of −5 D and a front face of curvature corresponding to a base 8 is considered thereafter. The diameter of the lens is equal to 80 mm.

A second lens of the prior art carrying this prescription has a thickness at its center equal to 1.4 mm and a thickness at its edges equal to 13.36 mm. It is beneficial to employ a lens having the same prescription, thinned down at its edges.

For equal prescription, a third lens determined by a method according to the invention, starting from this second lens of the prior art, possesses a thickness at the edges of less than 8.08 mm when the aspherical continuous layer ACL2 and the aspherical Fresnel layer AFL are placed on the front face of the lens.

For equal prescription, a fourth lens determined by a method according to the invention, starting from the first lens of the prior art, possesses a thickness at the edge of less than 5.51 mm when the aspherical Fresnel layer AFL is placed on the rear face of the lens and the aspherical continuous layer ACL2 is placed on the front face of the lens.

These third and fourth lenses have exactly the same thicknesses at the center as the second lens of the prior art, that is to say a center thickness equal to 1.4 mm. The reduction in thickness at the edges of the third and fourth lenses is respectively 39% and 58% with respect to the second lens according to the prior art; this being the sought-after objective. This result is attained without any ring appearing in a central and circular zone of diameter equal to 36 mm and 40 mm respectively for the third and the fourth lens.

Figure 8:
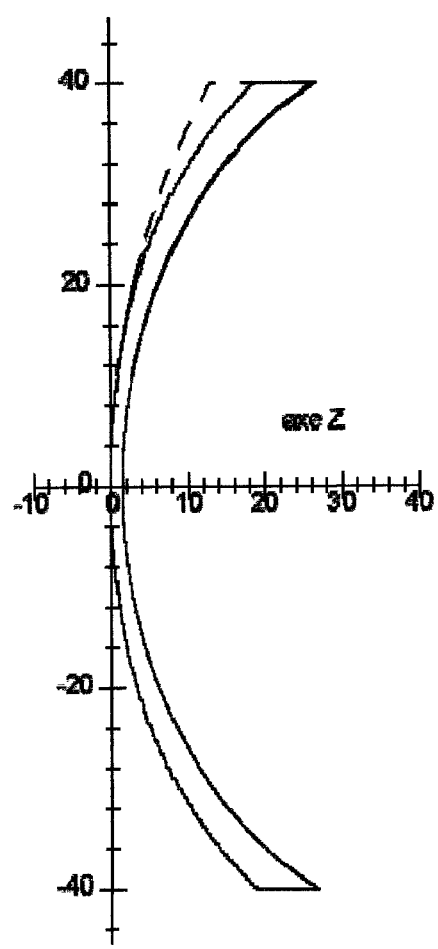

FIG. 8 represents in a sectional view: dotted line, the first lens according to the prior art and, solid line, the third exemplary lens produced by the method according to the invention.

Figure 9:
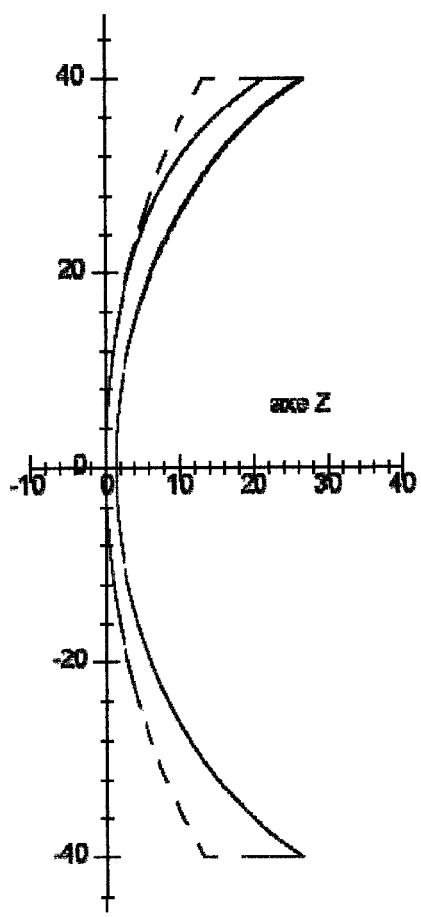

FIG. 9 represents in a sectional view: dotted line, the first lens according to the prior art and, solid line, the fourth exemplary lens produced by the method according to the invention.

Finally, a progressive multifocal lens having a prescription in terms of sphere +2 D and cylinder +1 D and an addition of 2.5 D, with a front face of curvature corresponding to a base 6, is considered.

A third lens of the prior art carrying this prescription has a thickness at its center equal to 7 mm and a thickness on its edges equal to 1 mm (on the lower edge of the lens) and 4.05 mm (on the upper edge). The diameter of the lens is equal to 80 mm. It is beneficial to employ a lens having the same prescription, comprising a thickness variation that is more reduced over the whole of the lens, even if locally a greater thickness may be tolerated. This is in order to favor a lens which is lighter and easier to mount in a frame.

For equal prescription, a fifth lens determined by a method according to the invention, starting from the third lens of the prior art, possesses a thickness on its lower edge, at the center and on its upper edge equal respectively to 2.57 mm, 3 mm and 5.32 mm when the aspherical Fresnel layer AFL and the aspherical continuous layer are placed on the rear face of the lens.

This fifth lens possesses lens thicknesses which vary less than those of the third lens of the prior art this being the sought-after objective. This is established on these three measurement points and is observed obviously in FIG. 10 which represents in a sectional view: dotted line, the third lens according to the prior art and, solid line, the fifth exemplary lens produced by the method according to the invention.

Figure 10:
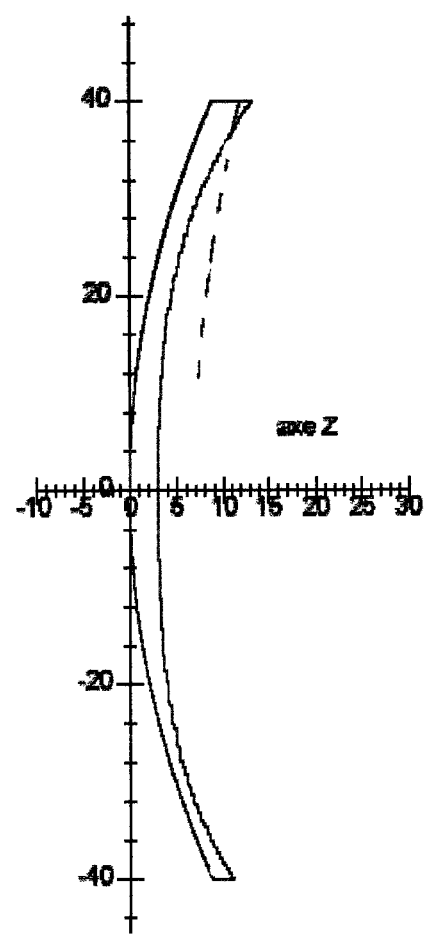

In particular, it is observed in FIG. 10 that even if the thicknesses at the lower and upper edges of the fifth exemplary lens according to the invention are greater than those of the third lens according to the prior art, on average the thickness of the fifth exemplary lens is substantially less than that of the third lens according to the prior art.

Figure 1:
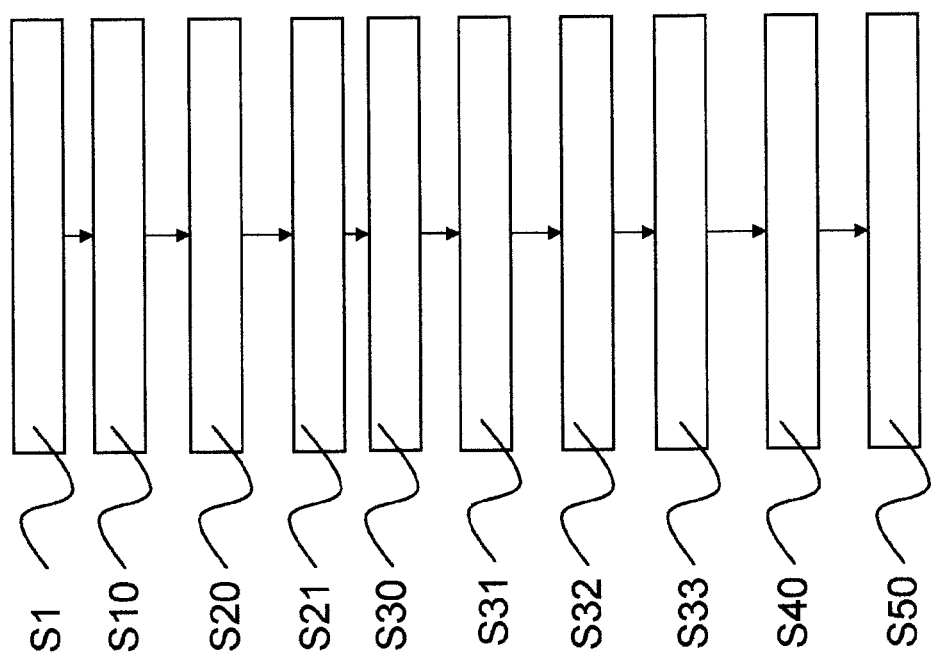
FIG. 1 presents a flowchart of a method for determining an ophthalmic lens according to an embodiment of the invention.
Figure 2:
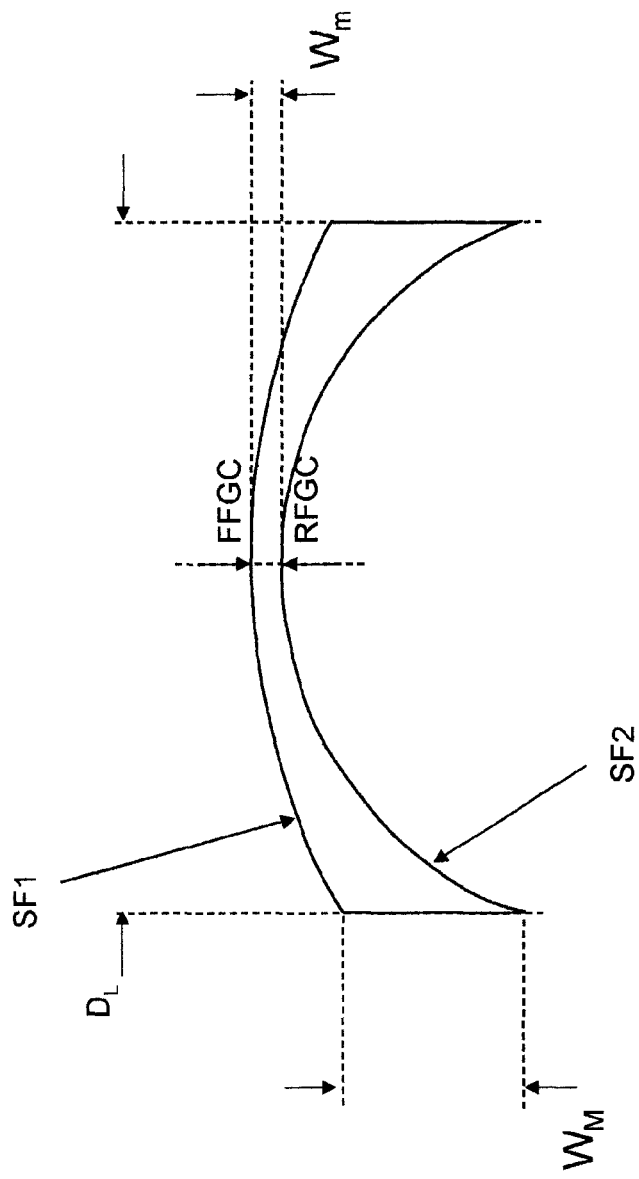
FIG. 2 shows a schematic sectional view of an ophthalmic lens determined in step 10 of a method according to one embodiment of the invention.

In FIG. 1 is represented a flowchart of a method for determining an ophthalmic lens which comprises a succession of 10 steps S1, S10, S20, S21, S30, S31, S32, S33, S40 and S50.

The objective of the method according to the invention is considered to be the determination of an ophthalmic lens of circular outline of diameter $D_L$ comprising a front face and a rear face, carrying a given prescription and satisfying minimum and maximum thickness constraints. According to the prescription, the ophthalmic lens can be unifocal and carry a positive or negative power or else be progressive multifocal.

Step S1 consists of a definition of an optical target LT of a lens which complies with the prescription and which possesses a minimum thickness $W_m$. The minimum thickness of the lens is usually imposed so as to meet a manufacturing constraint: very slender lenses are fragile or sharp, or else difficult to mount in rimmed frames.

A lens under wearing conditions is then considered, by fixing the values of eye-lens distance, of pantoscopic angle (or vertical inclination) and of wrap. The expression "optical target" defines a set of values of power, of astigmatism modulus and of astigmatism axis for given directions of gaze.

Step S10 consists in determining a first virtual ophthalmic lens VL1 comprising on its front face a first surface SF1 and on its rear face a second surface SF2. The first and second surfaces SF1, SF2 are configured in such a way that said first virtual lens VL1 complies with said prescription and possesses at each of its points a thickness greater than or equal to the minimum thickness Wm. The expression "determination" is understood to mean here a virtual determination, that is to say it is sought to obtain a description in a numerical form of the first and second surfaces SF1, SF2 and information making it possible to position these two surfaces with respect to one another by numerical calculations carried out with the aid of a computer.

Step S10 can be implemented in accordance with several variants:

The determination of the first surface SF1 precedes a determination of the second surface SF2 and the determination of the second surface SF2 consists of an optical optimization employing said optical target LT.

The determination of the second surface SF2 precedes a determination of the first surface SF1 and the determination of the first surface SF1 consists of an optical optimization employing said optical target LT.

The determination of the first surface SF1 and of the second surface SF2 is iterative and consists of a joint optical optimization of the two surfaces SF1, SF2 employing said optical target LT. More precisely, a determination of one of the faces (for example the first surface SF1) is carried out by optical optimization, the other face (here, the second surface SF2) being fixed. This process is iterated, this time fixing the first surface and calculating the second surface by the same optical optimization, seeking for example to reduce the thicknesses of the final lens.

Advantageously, the optical target LT corresponds to the optical performance of an ophthalmic lens according to the prior art.

Once the first virtual lens VL1 has been determined, so can its maximum thickness $W_M$ in its turn. Accordingly, in a step S20, the thickness of the first virtual lens is evaluated at any point of one of the surfaces. The maximum thickness $W_M$ of the first virtual lens VL1 corresponds to the highest of the thicknesses evaluated. Step S20 is also implemented with the aid of a computer.

In step S21 is determined, as constraint, a diameter $D_F$ and a height h of an aspherical continuous layer ACL1, itself employed to determine an aspherical Fresnel layer AFL, as will be specified further on. The value of the height h is all the lower the stronger the constraint on the maximum thickness $W_M$. The height h is in general of the order of a few hundred micrometers. The value of the diameter $D_F$ is in general greater than 30 mm.

The person skilled in the art, a designer of ophthalmic lenses, ascertains and manipulates a "layer" which is a representation of a virtual surface describing an evolution of a height z at any point of a plane referenced by its Euclidian coordinates (x,y). A layer can be added point-by-point to a surface carried by the face of an ophthalmic lens. The addition of a layer to another surface is also called "addition" or "superposition" and consists of an algebraic summation of the components according to their height or altitude z1. The layer can take the form of a continuous function in z1, one will speak of a "continuous layer", but can also comprise discontinuities in z1 or in derivatives of z1 or have a discrete representation. An exemplary use of continuous layers is given in the international application filed by the applicant and published under the reference WO2011/000845 A1.

A Fresnel layer is an exemplary non-continuous layer which comprises a plurality of rings and a plurality of discontinuities delimiting the rings. The discontinuities are inscribed in one another, the discontinuity in which no discontinuity is inscribed being called the "first discontinuity".

A first aspherical continuous layer ACL1 joining points forming a continuous surface referenced with respect to a first datum defined by a first origin O1 and a first system of axes (x1, y1, z1) is modeled in a step S30. The first continuous layer ACL1 is configured so that the first origin O1 forms part of the first continuous layer ACL1 and that it comprises at this point O1 a zero curvature according to one of said axes z1 first system of axes and so that the points making up the first continuous layer ACL1 which are separated from said axis z1 by a radial distance of strictly less than $D_F/2$ have a component according to said axis z1 that is strictly less than said height h.

Figure 5:
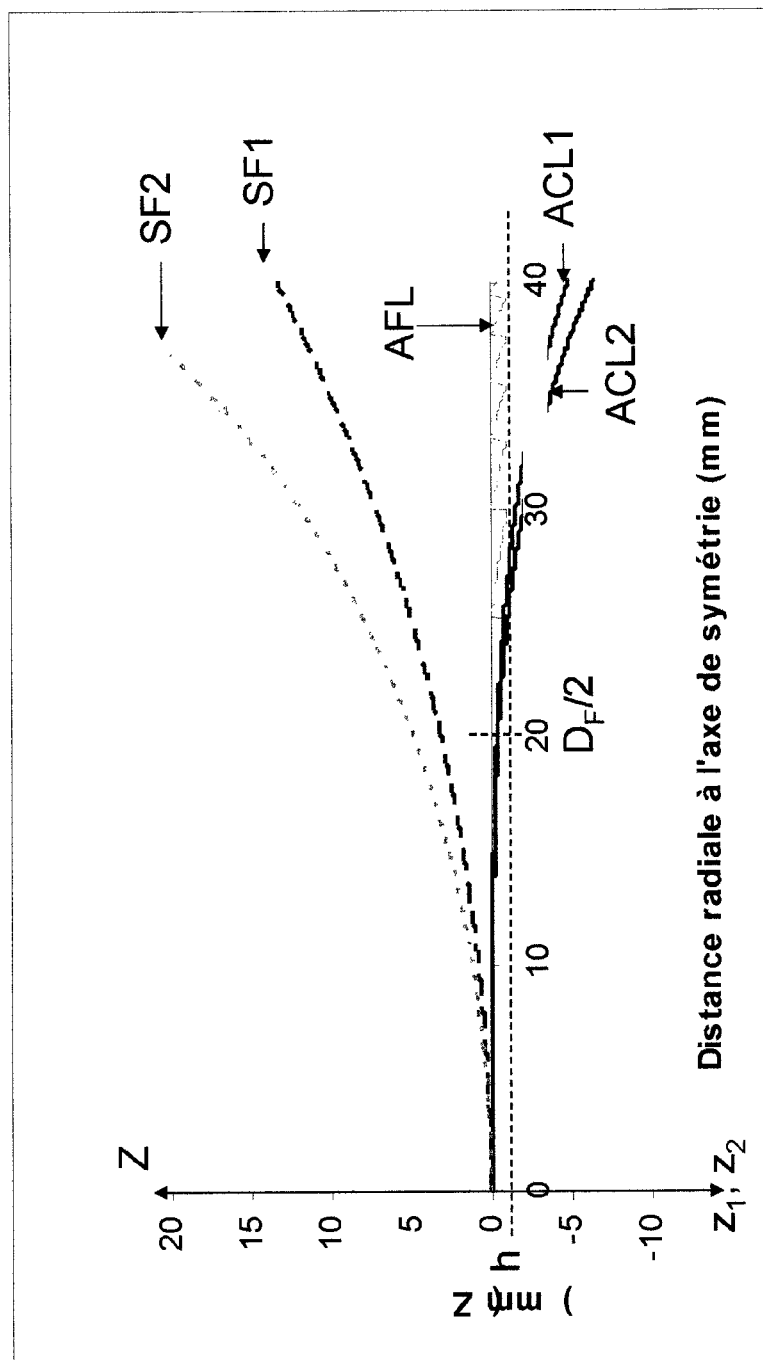
FIG. 5 represents for the configuration represented in FIG. 4a an exemplary radial profile of the first surface SF1, of the second surface SF2, of the aspherical continuous layer ACL1, of the aspherical Fresnel layer AFL, of the aspherical continuous layer ACL2.

Let us consider firstly a radial profile of the first continuous layer ACL1 corresponding for example to the profile of a section of a first continuous layer ACL1 by a plane passing through the axis z1. In FIG. 5 is represented a graph having the axis z1 as ordinate and the Euclidian distance r from the axis $z_1$ along an axis orthogonal to the axis z1, one will speak of "radial distance".

By employing the qualifier "aspherical continuous layer ACL1" is meant that the radial profile of the first continuous layer ACL1 is aspherical. That is to say that although the radial profile of the first continuous layer ACL1 exhibits a globally spherical shape on the scale of the representation of FIG. 5, it comprises local variations of curvatures on a scale of a micrometer or on a lower scale which are not visible on the scale of the representation of FIG. 5.

Here the first continuous layer ACL1 is characterized by the fact that the points of the profile separated from the axis z1 by a radial distance of strictly less than $D_F/2$ have a component along the axis z1 that is strictly less than said height h.

According to one embodiment, the first continuous layer ACL1 comprises a symmetry of revolution about a first axis of symmetry D1 passing through the first origin O1, where said first continuous layer ACL1 is described in the form of an expression of the type $$Z(r_1) = \sum_{i=2}^{ASP\_NMAX} K_i r_1^{2i}$$

where $r_1$ is a distance from the first axis of symmetry D1, with $0 \leq r_1 \leq D_L/2$, i and ASP_NMAX are integer numbers, $K_i$ are real numbers for $2 \leq i \leq ASP\_NMAX$.

Advantageously, the axis $D_1$ coincides with the axis z1 of the first datum.

Within the framework of this patent application, the layers involved, (Fresnel layers or continuous layers) all have aspherical profiles. Consequently, this qualifier can be omitted in order to facilitate the reading of the present patent application.

Figure 4A:
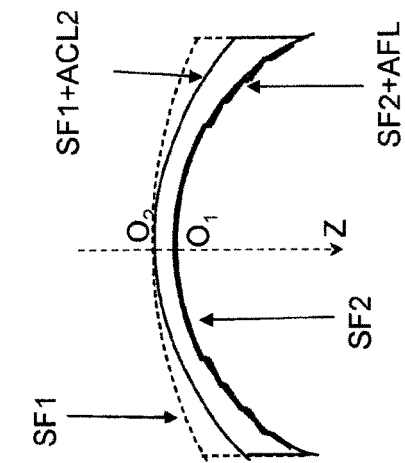
FIG. 4a presents a schematic sectional view of a first exemplary unifocal ophthalmic lens produced by a method according to one embodiment of the invention, where the aspherical Fresnel layer AFL is disposed on the front face and the aspherical continuous layer ACL2 is disposed on the rear face.

In a step S31 is modeled a second aspherical continuous layer ACL2 joining points forming a continuous surface, referenced with respect to a second datum defined by a second origin O2 and a second system of axes (x2, y2, z2), where the second continuous layer ACL2 is configured so that the second origin O2 is one of the points of the second continuous layer ACL2 which comprises at this point O2 a zero curvature according to one of the axes z2 of the second system of axes (x2, y2, z2). The second continuous layer ACL2 can also be added to a surface carried by a face of an ophthalmic lens. The first and the second system of axes (x1, y1, z1, x2, y2, z2) are represented in FIG. 4a.

Furthermore, the radial profile of a first and of a second face SF1, SF2 of the first virtual ophthalmic lens VL1, as well as the radial profile of the second continuous layer ACL2, are represented in FIG. 5.

The continuous layer ACL2 is of the same nature as the first continuous layer ACL1 described above but it is not necessarily equal at any point to the continuous layer ACL1. In the example represented in FIG. 5, the choice is made of a continuous layer ACL2 which exhibits a symmetry of revolution about an axis D2 passing through the geometric center FFGC, RFGC of the face which carries the continuous layer ACL2. This continuous layer ACL2 is therefore perfectly defined by its aspherical continuous radial profile, for example the radial profile ACL2 represented in FIG. 5. The continuous layer ACL2 possesses a zero curvature at the geometric center of the face which carries it.

Step S31 is carried out with the aid of a computer.

According to one embodiment, the second continuous layer ACL2 comprises a symmetry of revolution about a second axis of symmetry D2 passing through the second origin O2, where said second continuous layer ACL2 is described in the form of an expression of the type $$Z(r_2) = \sum_{j=2}^{ASP\_NMAX'} K'_j r_2^{2j}$$

for $0 \leq r_2 \leq D_L/2$ where $r_2$ is a radial distance from the second axis of symmetry $D_2$, j and ASP_NMAX' are integer numbers and $K'_j$ are real numbers for $2 \leq j \leq ASP\_NMAX'$.

Advantageously, $ASP\_NMAX \leq 20$ and $ASP\_NMAX' \leq 20$ and preferably $ASP\_NMAX \leq 4$ and $ASP\_NMAX' \leq 4$.

Advantageously, the axis $D_2$ coincides with the axis z2 of the second datum.

A step S32 relates to the modeling of an aspherical Fresnel layer AFL on the basis of a cutting of the first continuous layer ACL1 along the axis z1. The Fresnel layer AFL is referenced with respect to the first datum and all can be carried, like the first continuous layer ACL1, by one of the faces of an ophthalmic lens.

This Fresnel layer AFL comprises a plurality of rings delimited by discontinuities along the axis z1 which are located in a plane orthogonal to said axis z1 passing through said first origin O1. The discontinuities are inscribed in one another. Among the discontinuities, the discontinuity in which no other discontinuity is inscribed is called the "first discontinuity". The cutting is configured so that a circle of diameter $D_F$ centered on said first origin O1 is inscribed in said first discontinuity.

Between two discontinuities there is a ring or "tooth" which exhibits an aspherical profile.

The production of a Fresnel layer on the basis of a continuous layer is a well known technique described for example in European patent application EP 2217962A1 filed by the applicant and which relates to a curved patch intended to be fixed on a concave face of an optical member; this technique will not be recalled here but an illustrative exemplary method making it possible to deduce a radial profile of the Fresnel layer AFL on the basis of a radial profile of the first continuous layer ACL1 is briefly described, these two profiles being represented in FIG. 5. This method produces a Fresnel layer with constant ring height.

A height of cutting of the Fresnel layer which is greater than the determined height h is considered.

In what follows, the height of a point of the first continuous layer ACL1 designates the component along z1 of this point. A point M of the profile of the first continuous layer ACL1 is referenced by its radial distance r from the axis z1. To each point M of the radial profile of the first continuous layer ACL1 there corresponds a point M' of the radial profile of the Fresnel layer AFL which is separated from the axis z1 by a radial distance equal to r.

To obtain a radial profile of the Fresnel layer AFL on the basis of the radial profile of the first continuous layer ACL1, the points M of the radial profile of the first continuous layer ACL1 are traversed starting from r=0 in the direction of increasing radial distances. As long as the height of the point M is strictly less than the cutting height, the height of the point M' remains equal to the height of the point M. To the point M, which has a height equal to the cutting height, there corresponds a point M' whose height is fixed at 0: this is the first discontinuity. When the traversal of the radial profile of the first continuous layer ACL1 is continued for greater radial distances, the height of the point M' follows the same variations as that of the height of the point M until the height of the point M attains an integer multiple of the cutting height. At the radial distance where this occurs, the height of the corresponding point M' is again fixed at 0, this is the second discontinuity.

Thus, the radial profile of the Fresnel layer AFL exhibits on the scale of the representation of FIG. 5 a succession of "teeth" delimited by discontinuities in z1, also called "jumps" and demarcated by a difference of height between two points: the first which has a height equal to the cutting height, the second which has a zero height. Between two discontinuities, the radial profile of the Fresnel layer AFL evolves in the same manner as the radial profile of the first continuous layer ACL1. In particular, locally the radial profile of the Fresnel layer AFL comprises the same variations in curvature as the radial profile of the first continuous layer ACL1.

The "teeth" of the radial profile of the Fresnel layer AFL demarcate so-called "Fresnel" rings on the Fresnel layer AFL. The radial profile ACL1 is aspherical like the radial profile AFL on each of the teeth. One will therefore also speak of rings with aspherical profile.

By considering a form of first continuous layer ACL1 constrained by the height h and $D_F$ on the one hand and by a cutting height greater than the height h, an absence of rings is imposed inside a circular central zone of the Fresnel layer AFL, which preferably has a diameter of greater than or equal to $D_F$=30 mm. This diameter of 30 mm corresponds to a lens zone covered by a field of view of a wearer in central vision of +/−30 degrees for a distance between lens and center of rotation of the wearer's eye equal to 25.5 mm. It is desired that no Fresnel ring be placed in this circular zone so as to avoid any inconvenience (nuisance reflections) which would be caused to the wearer in his central vision and caused by the interaction between the incident light and the rings of the Fresnel layer.

Likewise, methods are known for producing a Fresnel layer with constant ring width, for which the first continuous layer ACL1 is cut such that starting from the first discontinuity, the distance separating two successive discontinuities remains constant.

Fresnel layer production methods which combine the two previous methods are also known: according to the zone of the first continuous layer ACL1 considered, rings with constant height or with constant width are created, a random distribution of width or a random distribution of height is also possible.

Moreover, the discontinuities described hereinabove are discontinuities along z1. Fresnel layer cutting methods are also known in which the discontinuities created are discontinuities according to the derivative of z1 and for which the derivative in z1 is locally constant so that at this location, the profile of the Fresnel layer is rectilinear with a chosen inclination.

Advantageously, the height of the rings (or "teeth") lies between 10 µm and 500 µm.

FIGS. 4a, 4b, 4c, 4d, 5, 6, 7, 8, 9, 10 illustrate embodiments where the first and the second continuous layer ACL1 and ACL2 exhibit a symmetry of revolution with respect to the axis z1 and z2. These embodiments are advantageous in that they are achievable with conventional manufacturing means.

In FIGS. 4a, 4b, 4c, 4d, 6, 7, 8, 9, and 10 the axis Z represents the direction normal to the front face of the lens. The wearer's eye is placed on the positive side of the axis Z.

For all the examples represented in FIGS. 4a, 4b, 4c, 4d, 5, 6, 7, 8, 9, and 10 the axis Z coincides with the axis of symmetry D1 of the Fresnel layer AFL and with the axis z1 of the first datum.

In FIG. 5, the radial profile of the Fresnel layer AFL is devoid of teeth for radial distances of less than $D_F/2$. It is furthermore observed that the more the radial distance increases, the closer together are the discontinuities.

In FIGS. 6 to 10 it is difficult to appreciate the aspherical nature of the radial profile of the second continuous layer ACL2 and of the "teeth" of the profile of the Fresnel layer AFL because of the representation scale chosen.

Figure 3:
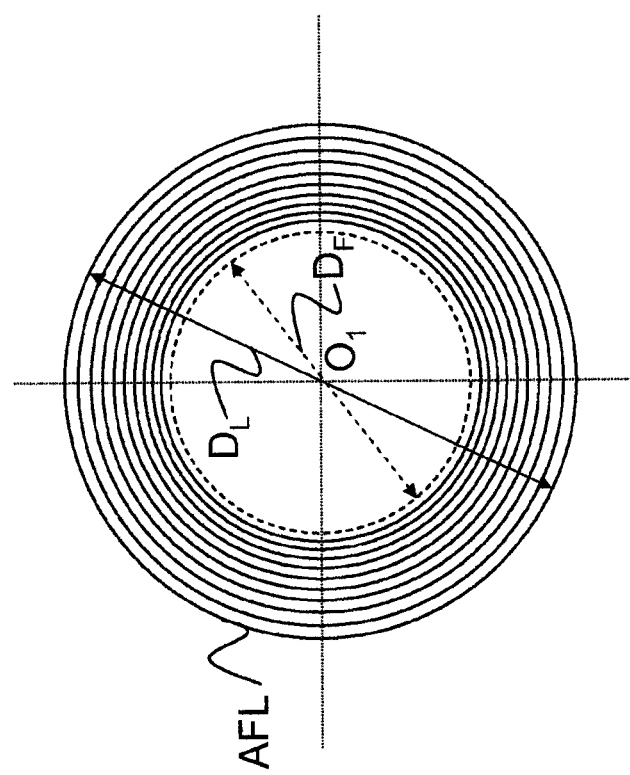
FIG. 3 represents a view from above of an aspherical Fresnel layer AFL.

FIG. 3 represents a view from above of a Fresnel layer AFL carried by one of the faces of the lens where the circular central zone of diameter $D_F$ appears dotted and where the discontinuities have a circular shape (represented by solid lines).

The Fresnel layer AFL constitutes a microstructure produced by cutting the first continuous layer ACL1 into Fresnel rings. The Fresnel layer AFL or the second continuous layer ACL2 are carried by a continuous surface called the "carrier". That is to say at any point of the face, the height of the point can be expressed as the algebraic sum of a height of the carrier and of a height of the layer AFL or ACL2.

Each of the surfaces SF1, SF2 can play the role of a "carrier", that is to say each of the layers ACL2, AFL can be superposed on this surface. It goes without saying that the layers ACL2, AFL can be carried by one and the same surface.

Advantageously the first and the second axis of symmetry D1, D2 coincide.

For all the examples represented in FIGS. 4a, 4b, 4c, 4d, 5, 6, 7, 8, 9, and 10 the axis Z coincides with the axis of symmetry D2 of the aspherical continuous layer ACL2 and with the axis z2 of the second datum.

In a step S33, a second virtual lens VL2 is finally modeled on the basis of the first virtual lens VL1 determined in step S10. To obtain this second virtual lens VL2, the Fresnel layer AFL is added to one of the faces of the first virtual lens VL1 and the second aspherical continuous layer ACL2 is added to one of the faces of said first virtual lens VL1, to give said second virtual lens VL2 so that the first origin O1 is placed on the geometric center FFGC, RFGC of the face which carries said first continuous layer ACL1 and so that the second origin (O2) is placed on a predefined point of the face which carries said second continuous layer (ACL2) and so that said second virtual lens VL2 possesses at at least one point a thickness equal to $W_m$.

Thus, by construction, when the Fresnel layer AFL is added to a surface carried by one of the faces of an ophthalmic lens, all the discontinuities that it comprises and consequently all the rings that it comprises are placed outside a circular central zone of diameter $D_F$, centered on the geometric center of the face which carries said surface. Moreover, the Fresnel layer AFL possesses a zero curvature at the level of the geometric center of the face which carries it.

Advantageously, for a unifocal lens, the predefined point is the geometric center of the face which carries the second continuous layer ACL2.

Advantageously, for a multifocal lens, the predefined point is the far vision control point referenced on the face which carries the second continuous layer ACL2.

In this manner the addition of the second continuous layer ACL2 does not modify the optical properties of the second virtual lens VL2 in the vicinity of the far vision control point with respect to those of the first virtual lens VL1 in the vicinity of the far vision control point.

In the particular case where the first virtual lens VL1 has a positive power, and where the second continuous layer ACL2 is added to the rear face (situation illustrated in FIG. 10), it is apparent that the simple operation of addition between a layer and the surface carried by the rear face would lead to an increase in the thickness of the second virtual lens VL2. In this situation, it is therefore required that the addition operation be followed by a shift (or translation) of the surface resulting from the addition along the axis z2, so that said second virtual lens VL2 possesses, at at least one point, a thickness equal to $W_m$.

Steps S32 and S33 are implemented with the aid of a computer.

Figure 4B:
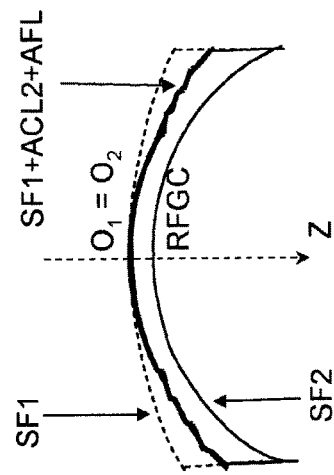
FIG. 4b presents a schematic sectional view of a second exemplary unifocal ophthalmic lens produced by a method according to one embodiment of the invention, where the aspherical Fresnel layer AFL is disposed on the rear face and aspherical continuous layer ACL2 is disposed on the front face.
Figure 4C:
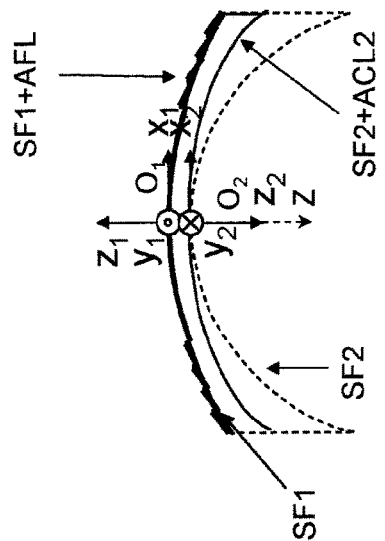
FIG. 4c presents a schematic sectional view of a third exemplary unifocal ophthalmic lens produced by a method according to one embodiment of the invention, where the aspherical Fresnel layer AFL and the aspherical continuous layer ACL2 are disposed on the rear face.
Figure 4D:
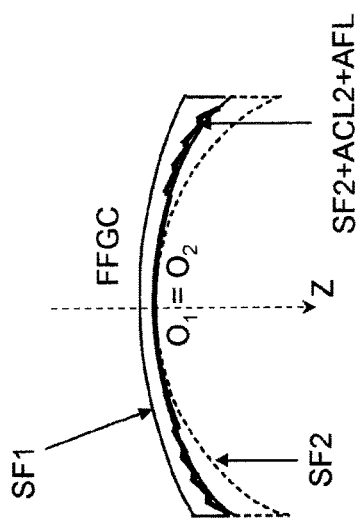
FIG. 4d presents a schematic sectional view of a fourth exemplary unifocal ophthalmic lens produced by a method according to one embodiment of the invention, where the aspherical Fresnel layer AFL and the aspherical continuous layer ACL2 are disposed on the front face.

In FIGS. 4a, 4b, 4c, 4d, sectional views of the 4 achievable dispositions for the second virtual lens VL2 are represented by depicting in addition to the section through the first virtual lens shown dotted, the profile of the Fresnel layer AFL and the profile of the second aspherical continuous layer ACL2 superposed on one of the two surfaces SF1, SF2:
- in FIG. 4a, the Fresnel layer AFL is disposed on the front face and the second aspherical continuous layer ACL2 is disposed on the rear face;
- in FIG. 4b, the Fresnel layer AFL is disposed on the rear face and the second aspherical continuous layer ACL2 is disposed on the front face;
- in FIG. 4c, the Fresnel layer AFL and the second aspherical continuous layer ACL2 are disposed on the rear face;
- in FIG. 4d, the Fresnel layer AFL and the second aspherical continuous layer ACL2 are disposed on the front face.

In these figures:

The profile of the first virtual lens is represented dotted.

The profile of the Fresnel layer AFL added to the profile of the surface which carries it is represented by a thick continuous line. Teeth representing the Fresnel rings are observable.

The profile of the second continuous layer ACL2 added to the profile of the surface which carries it is represented by a slender continuous line.

In FIGS. 4c and 4d, the thick continuous line represents the profile of the superposition of the Fresnel layer AFL and of the second continuous layer ACL2 on the profile of the surface which carries these two layers.

The second virtual lens VL2 is delimited:
- in FIG. 4a: by on the one hand, the rear face which carries the surface SF2 and the second continuous layer ACL2 and on the other hand, the front face which carries the surface SF1 and the Fresnel layer AFL.
- in FIG. 4b: by on the one hand, the rear face which carries the surface SF2 and the Fresnel layer AFL and on the other hand the front face which carries the surface SF1 and the second continuous layer ACL2.
- in FIG. 4c: by on the one hand, the rear face which carries the surface SF2, and the Fresnel layer AFL and the second continuous layer ACL2 and on the other hand, the front face which carries the surface SF1.
- in FIG. 4d: by on the one hand, the rear face which carries the surface SF2 and, and on the other hand, the front face resulting from the addition of the surface SF1, of the Fresnel layer AFL and of the second continuous layer ACL2.

The position of the Fresnel layer AFL or of the second continuous layer ACL2 on such and such face of the lens is chosen as a function of the design or manufacturing constraints: placing the Fresnel layer AFL on the rear face of the lens makes it possible to reduce the visibility of the rings on the lenses by people other than the wearer, conversely, placing the Fresnel layer AFL on the front face simplifies manufacture; finally, placing the Fresnel layer AFL and the second continuous layer ACL2 on the same face makes it possible to reduce the residual astigmatism defects for the wearer.

Advantageously, the Fresnel layer AFL is carried on the face of said second virtual lens VL2 which also carries the second continuous layer ACL2.

Advantageously, the Fresnel layer AFL and the second continuous layer ACL2 are carried on different faces of said second virtual lens VL2.

In a step S40, the Fresnel layer AFL and the second continuous layer ACL2 are determined by an optical optimization employing said optical target LT so that said second virtual lens VL2 complies with said prescription and so that at any point of said second virtual lens VL2, said second virtual lens VL2 possesses a thickness W such as $W_m \leq W < W_M$.

Step S40 is implemented with the aid of a computer.

Step S40 can be implemented in accordance with several variants:
- The determination of the second continuous layer ACL2 precedes a determination of said Fresnel layer AFL.
- The determination of the Fresnel layer AFL precedes a determination of the second continuous layer ACL2.

In the first variant, it is chosen to position the second continuous layer ACL2 on one of the faces of the lens for example the rear face of the lens, with a view to reducing the thickness of the second virtual lens, and then to position on one of the faces of the lens, for example still on the rear face, the Fresnel layer AFL. To summarize, the second continuous layer ACL2 is fixed and the Fresnel layer AFL is determined accordingly.

In particular, for the embodiment in which the first and second continuous layer ACL1 and ACL2 each have an analytical expression, this variant consists in executing a step S31 just once so as to fix a suite of parameters $K'_j$ for $1 \leq j \leq ASP\_NMAX'$ of the second continuous layer ACL2 and then in executing steps S30 and S32 iteratively so as to determine a suite of parameters $K_i$ for $1 \leq i \leq ASP\_NMAX$ of the first continuous layer ACL1 as a function of an optical ray tracing calculation executed in a step S40 on the second virtual lens comprising the Fresnel layer AFL and the second continuous layer ACL2. The Fresnel layer AFL being constructed on the basis of the first continuous layer ACL1 as explained previously.

As long as the optical calculation carried out in step S40 does not give a result sufficiently close to the optical target LT, steps S30 and S32 of modeling the Fresnel layer AFL are executed while considering an identical cutting scheme. If the result of the optical calculation is not satisfactory even after a few iterations, step S31 is implemented again.

In the second variant, if the analytical expressions for the first and second continuous layers ACL1, ACL2 given as example are considered, the coefficients $K_i$ describing the first continuous layer ACL1 employed to determine the Fresnel layer AFL are fixed firstly, and then the coefficients $K'_j$ describing the second continuous layer ACL2 are fixed subsequently.

In particular, for the embodiment in which the first and second continuous layers ACL1, ACL2 have an analytical expression, this variant consists in executing a step S30 just once so as to fix a suite of parameters $K_i$ for $1 \leq i \leq ASP\_N-MAX$ of the first continuous layer ACL1 and then in executing step S31 iteratively so as to determine a suite of parameters $K'_j$ for $1 \leq j \leq ASP\_NMAX'$ of the second continuous layer ACL2 as a function of an optical ray tracing calculation executed in a step S40 on the second virtual lens comprising the Fresnel layer AFL and the continuous layer ACL2, the Fresnel layer AFL being constructed on the basis of the first continuous layer ACL1 as explained previously.

As long as the optical calculation does not give a result sufficiently close to the optical target LT, step S31 of modeling the continuous layer ACL2 is executed.

A third variant is naturally achievable, where the Fresnel layer AFL and the second continuous layer ACL2 are determined simultaneously. This third variant is for example achievable by restricting the complexity of the representation of the first and second continuous layers ACL1, ACL2, for example by fixing $K_i$ and $K'_j$ at zero for any integers i and j different from 2 or 3.

In step S50, the ophthalmic lens to be produced is determined as being equal to the result of the optical optimization of step S40. Step S50 is implemented with the aid of a computer.

As indicated earlier, the method described hereinabove can be implemented to produce the five examples of advantageous lenses cited above. The table which follows summarizes the particular parameters used in the method according to the invention to produce the five examples of advantageous ophthalmic lenses as well as the result of the optical optimizations carried out in step S40 to obtain these five examples of lenses.

TABLE 1

Unifocal lens +5D, diameter 80 mm

| | SF1 | SF2 | Thickness at the center | Thickness at the edges | Aspherical continuous layer ACL1 Coefficients | Height (h) | Diameter ($D_F$) | Aspherical Fresnel layer AFL Diameter first discontinuity | Aspherical continuous layer ACL2 Coefficients |
|---|---|---|---|---|---|---|---|---|---|
| 1st lens of the prior art | Base 8, radius of curvature: 67.1 mm | Radius of curvature at the center: 130.0 mm | 9 mm | 2.54 mm | Not relevant | Not relevant | Not relevant | Not relevant | Not relevant |
| 1st exemplary lens | | | 3.82 mm | 2.54 mm | $K_2 = 1.75E{-}6$ | 500 μm | 30 mm | 39 mm | $K'_2 = 2.15E{-}6$ |
| 2nd ex. lens | | | 4.47 mm | 2.54 mm | $K_2 = -1.81E{-}6$ | 500 μm | 30 mm | 36 mm | $K'_2 = 2.0E{-}6$ |

TABLE 2

Unifocal lens −5D, diameter 80 mm

| | SF1 | SF2 | Thickness at the center | Thickness at the edges | Aspherical continuous layer ACL1 Coefficients | Height (h) | Diameter ($D_F$) | Aspherical Fresnel layer AFL Diameter first discontinuity | Aspherical continuous layer ACL2 Coefficients |
|---|---|---|---|---|---|---|---|---|---|
| $2^{nd}$ lens of the prior art | Base 8, radius of curvature: 67.10 mm | Radius of curvature at the center: 44.20 mm | 1.40 mm | 13.36 mm | Not relevant | Not relevant | Not relevant | Not relevant | Not relevant |
| $3^{rd}$ ex. lens | | | 1.40 mm | 8.08 mm | $K_2 = -2.5E{-}6$ | 500 μm | 30 mm | 36 mm | $K'_2 = 2.2E{-}6$ |
| 4th ex. lens | | | 1.40 mm | 5.51 mm | $K_3 = 4.0E{-}9$ | 500 μm | 30 mm | 40 mm | $K'_3 = 2.0E{-}9$ |

TABLE 3

Multifocal lens, SPH = +2D; CYL = +1D; ADD = 2.5D; diameter 80 mm

|  | SF1 | SF2 | Thickness at the center | Thickness at the edges | Aspherical continuous layer ACL1 Coefficients | Height (h) | Diameter ($D_F$) | Aspherical Fresnel layer AFL Diameter first discontinuity | Aspherical continuous layer ACL2 Coefficients |
|---|---|---|---|---|---|---|---|---|---|
| 3rd lens of the prior art of 5th ex. lens | Base 6 (radius of curvature 94.75 mm) | Progressive and toric surface | 7 mm<br>3 mm | 1 mm/ 4.05 mm<br>2.57 mm/ 5.32 mm | Not relevant<br>$K_2 = -2.1E{-}6$ | Not relevant<br>500 μm | Not relevant<br>30 mm | Not relevant<br>38 mm | Not relevant<br>$K'_2 = 2.1E{-}6$ |

In the foregoing, the reference to "an embodiment" signifies that a particular characteristic, the structure, or a characteristic described in conjunction with the embodiment may be included in at least one implementation of the invention. The appearances of the expression "in one embodiment" at various places in the foregoing detailed description do not necessarily all refer to the same embodiment. Likewise, distinct or alternative embodiments are not necessarily mutually exclusive to other embodiments.

The invention claimed is:

1. A method for determining and manufacturing an ophthalmic lens comprising a front face and a rear face, the front face and the rear face each comprising a geometric center, a prescription being determined for a wearing of said lens by a wearer under usual wearing conditions, the method being implemented by computer and comprising steps for:

defining an optical target for said lens which complies with said prescription and a minimum thickness $W_m$ of said lens;

determining a first surface carried by a front face of a first virtual ophthalmic lens and a second surface carried by said rear face of said first virtual lens so that said first virtual lens complies with said prescription and possesses at each of its points a thickness greater than or equal to the minimum thickness $W_m$;

determining a maximum thickness $W_M$ of said first virtual lens;

determining, as a constraint, a diameter $D_F$ that is greater than or equal to 30 mm and a height h that is less than or equal to 500 μm, both being of a first aspherical continuous layer, the form of which is constrained by diameter $D_F$ and the height h;

modeling the first aspherical continuous layer with a radial profile and joining points forming a continuous surface, referenced with respect to a first datum defined by a first origin and a first system of axes, where the first continuous layer is configured so that the first origin is one of the points of the first continuous layer which comprises at this point a zero curvature according to one of said axes of said first system of axes and so that the points of the racial profile making up the first continuous layer which are separated from said axis by a radial distance of strictly less than $D_F/2$ have a height component according to said axis of strictly less than said height h;

modeling a second aspherical continuous layer joining points forming a continuous surface, referenced with respect to a second datum defined by a second origin and a second system of axes, where the second continuous layer is configured so that the second origin is one of the points of the second continuous layer which comprises at this point a zero curvature according to one of the axes of the second system of axes;

modeling an aspherical Fresnel layer with a radial profile on the basis of a cutting of said first continuous layer into Fresnel rings, the Fresnel layer being referenced with respect to the first datum, where said Fresnel layer comprises a plurality of the rings with aspherical profiles and a plurality of discontinuities located in a plane orthogonal to said axis passing through the first origin and delimiting said rings, said discontinuities being inscribed in one another, the discontinuity in which no discontinuity is inscribed being called the "first discontinuity", said cutting is configured so that a circle of diameter $D_F$ centered on said first origin is inscribed in said first discontinuity, at the discontinuities there is a difference of height between two points comprising a first point with a height equal to a cutting height greater than the height h and a second point with a zero height, between two discontinuities, the radial profile of the Fresnel layer evolving in a same manner as the radial profile of the first continuous layer;

modeling a second virtual ophthalmic lens on the basis of the first virtual lens, where said Fresnel layer is added to one of the first or second surfaces of said first virtual lens so that the first origin is placed on the geometric center of the face which carries said Fresnel layer and where the second continuous layer is added to one of the first or second surfaces of said first virtual lens so that the second origin is placed on a predefined point of the face which carries said second continuous layer and where said second virtual lens possesses at, at least one point, a thickness equal to $W_m$;

determining said Fresnel layer and said second layer by an optical optimization employing said optical target after the step of modeling the second virtual lens so that said second virtual lens complies with said prescription and so that it possesses a maximum thickness of strictly less than $W_m$; and determining and manufacturing said ophthalmic lens as the second virtual lens, said ophthalmic lens being determined as being equal to the result of the optical optimization carried out for determining said Fresnel layer and said second layer.

2. The method as claimed in claim 1, wherein the Fresnel layer and the second continuous layer are added on the same face of said second virtual lens.

3. The method as claimed in claim 1, wherein the Fresnel layer and the second continuous layer are added on different faces of said second virtual lens.

4. The method as claimed in claim 1, where a determination of said first surface precedes a determination of said second surface in the implementation of the step of determining said first surface and said second surface and where said determination of the second surface consists of an optical optimization employing said optical target.

5. The method as claimed in claim 1, where a determination of said second surface precedes a determination of said first surface in the implementation of the step of determining said first surface and said second surface and where said determination of the first surface consists of an optical optimization employing said optical target.

6. The method as claimed in claim 1, where a determination of the second continuous layer precedes a determination of the Fresnel layer in the implementation of the step of determining the Fresnel layer and the second continuous layer.

7. The method as claimed in claim 1, where a determination of said Fresnel layer precedes a determination of said second continuous layer in the implementation of the step of determining said Fresnel layer and said second continuous layer.

8. The method as claimed in claim 1, where said first surface is a "free form" surface.

9. The method as claimed in claim 1, where said second surface is a "free form" surface.

10. The method as claimed in claim 1, said ophthalmic lens comprising a diameter DL, wherein
said first continuous layer comprises a symmetry of revolution about a first axis of symmetry passing through the first origin, where said first continuous layer as modeled is described in the form of an expression of the type $$Z(r_1) = \sum_{i=2}^{ASP\_NMAX} K_i r_1^{2i}$$

where r1 is a distance from the first axis of symmetry, with $0 \leq r1 \leq D_L/2$, i and ASP_NMAX are integer numbers, Ki are real numbers for $2 \leq i \leq ASP\_NMAX$; and said second continuous layer comprises a symmetry of revolution about a second axis of symmetry passing through the second origin, where said second continuous layer as modeled is described in the form of an expression of the type $$Z(r_2) = \sum_{j=2}^{ASP\_NMAX'} K'_j r_2^{2j}$$

for $0 \leq r2 \leq D_L 2$ where r2 is a radial distance from the second axis of symmetry (D2), j and ASP_NMAX' are integer numbers and K'$_j$ are real numbers for $2 \leq j \leq ASP\_NMAX'$.

11. The method as claimed in claim 10, wherein ASP_NMAX$\leq$4 and ASP_NMAX'$\leq$4.

12. The method as claimed in claim 1, where said Fresnel layer is inscribed on a flexible patch of constant thickness, and where said flexible patch is applied to a surface carried by one of the faces of the lens.

13. A non-transitory computer program product comprising a series of instructions which when loaded into a computer gives rise to the execution by said computer of the steps of the method as claimed in claim 1.

14. A medium readable by computer carrying a series of instructions of the computer program product as claimed in claim 13.

15. The method as claimed in claim 10, wherein ASP_NMAX$\leq$20 and ASP_NMAX'$\leq$20.

* * * * *